(12) United States Patent
MacDonald et al.

(10) Patent No.: US 10,569,464 B2
(45) Date of Patent: Feb. 25, 2020

(54) CONNECTING METAL FOILS/WIRES AT DIFFERENT LAYERS IN 3D PRINTED SUBSTRATES WITH WIRE SPANNING

(71) Applicant: Board of Regents, The University of Texas System, Austin, TX (US)

(72) Inventors: Eric MacDonald, El Paso, TX (US); David Espalin, El Paso, TX (US); Isaac Varela, El Paso, TX (US); Ryan Wicker, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 391 days.

(21) Appl. No.: 15/426,344

(22) Filed: Feb. 7, 2017

(65) Prior Publication Data
US 2018/0354189 A1 Dec. 13, 2018

Related U.S. Application Data

(60) Provisional application No. 62/292,479, filed on Feb. 8, 2016.

(51) Int. Cl.
| | |
|---|---|
| *B29C 70/68* | (2006.01) |
| *B29C 70/70* | (2006.01) |
| *B29C 64/118* | (2017.01) |
| *B33Y 10/00* | (2015.01) |
| *B33Y 70/00* | (2020.01) |
| *B29C 64/106* | (2017.01) |

(Continued)

(52) U.S. Cl.
CPC .......... *B29C 64/118* (2017.08); *B29C 64/106* (2017.08); *B29C 69/001* (2013.01); *B29C 70/882* (2013.01); *B33Y 10/00* (2014.12); *B33Y 70/00* (2014.12); *B29C 2035/0838* (2013.01); *B29K 2101/12* (2013.01); *B29K 2705/00* (2013.01); *B29K 2995/0005* (2013.01); *B29K 2995/0006* (2013.01); *B29L 2031/3493* (2013.01); *B33Y 30/00* (2014.12); *B33Y 80/00* (2014.12)

(58) Field of Classification Search
CPC .......... B29C 2035/0838; B29C 64/106; B29C 64/118; B29C 69/001; B29C 70/68; B29C 70/70; B29C 70/882; B29K 2995/0005; B29K 2995/0006; B29L 2031/3493
USPC .... 264/104, 138, 162, 163, 259, 271.1, 279, 264/279.1, 308, 400, 401, 497
See application file for complete search history.

(56) References Cited

U.S. PATENT DOCUMENTS

| | | |
|---|---|---|
| 7,766,641 B2 | 8/2010 | Silverbrook |
| 8,665,479 B2 | 3/2014 | Tan et al. |

(Continued)

*Primary Examiner* — Leo B Tentoni
(74) *Attorney, Agent, or Firm* — Yee & Associates, P.C.

(57) ABSTRACT

A three-dimensional electronic, biological, chemical, thermal management, or electromechanical apparatus and method of configuring such an apparatus. In an example embodiment, an apparatus can include a substrate and one or more layers of a three-dimensional structure configured on and/or from the substrate. The three-dimensional structure includes one or more internal cavities configured by an extrusion-based additive manufacturing system enhanced with a range of secondary embedding processes. The three-dimensional structure can be configured with one or more structural integrated metal objects spanning one or more of the internal cavities of the three-dimensional structure for enhanced electromagnetic properties.

19 Claims, 6 Drawing Sheets

(51) Int. Cl.
  *B29C 70/88* (2006.01)
  *B29C 69/00* (2006.01)
  *B33Y 80/00* (2015.01)
  *B33Y 30/00* (2015.01)
  *B29K 101/12* (2006.01)
  *B29K 705/00* (2006.01)
  *B29L 31/34* (2006.01)
  *B29C 35/08* (2006.01)

(56) References Cited

U.S. PATENT DOCUMENTS

| | | |
|---|---|---|
| 9,193,110 B2 | 11/2015 | Pridoehl et al. |
| 9,216,546 B2 | 12/2015 | DeSimone et al. |
| 2007/0229927 A1 | 10/2007 | Iriguchi |
| 2008/0006966 A1* | 1/2008 | Mannella ............ B29C 64/106 264/259 |
| 2013/0170171 A1 | 7/2013 | Wicker et al. |
| 2014/0268604 A1 | 9/2014 | Wicker et al. |
| 2014/0268607 A1 | 9/2014 | Wicker et al. |
| 2015/0276941 A1 | 10/2015 | Liu et al. |

\* cited by examiner

CONNECTING METAL FOILS/WIRES AT DIFFERENT LAYERS IN 3D PRINTED SUBSTRATES WITH WIRE SPANNING

CROSS-REFERENCE TO PROVISIONAL APPLICATION

This nonprovisional patent application claims the benefit under 35 U.S.C. § 119(e) and priority to U.S. Provisional Patent Application Ser. No. 62/292,479 filed on Feb. 8, 2016, entitled "Connecting Metal Foils/Wires at Different Layers in 3D Printed Substrates With Wire Spanning," which is hereby incorporated herein by reference in its entirety.

TECHNICAL FIELD

Embodiments are related to the field of additive manufacturing, and more particularly to the printing of three-dimensional (3D) objects and components using material extruders. Embodiments are also related to the manufacture of 3D printed components with structurally integrated metal objects that can serve as thermal or electrical interconnects.

BACKGROUND 3D printing is an AM (Additive Manufacturing) process for making three-dimensional objects of arbitrary shapes from digital models. Other terms used synonymously to refer to 3D printing include additive manufacturing, layer manufacturing, rapid prototyping, layer-wise fabrication, solid freeform fabrication, and direct digital manufacturing. In 3D printing, successive layers of a material are laid down adjacently to form the objects. Typically a round or ribbon like material is extruded through a movable nozzle.

Examples of AM processes and 3D printers are disclosed in U.S. Patent Application Publication No. 2013/0170171, entitled "Extrusion-Based Additive Manufacturing System for 3D Structural Electronic, Electromagnetic and Electromechanical Components/Devices," which was published on Jul. 4, 2013 and is incorporated herein by reference in its entirety. Other examples of AM processes and 3D printers are disclosed in U.S. Patent Application Publication No. 2014/0268604, entitled "Methods and Systems For Embedding Filaments in 3D Structures, Structural Components, and Structural Electronic, Electromagnetic and Electromechanical Components/Devices," which was published on Sep. 18, 2014 and is incorporated herein by reference in its entirety. Still, other examples of AM processes and 3D printers are disclosed in U.S. Patent Application Publication No. 2014/0268607, entitled "Methods and Systems For Connecting Inter-Layer Conductors and Components in 3D Structures, Structural Components, and Structural Electronic, Electromagnetic and Electromechanical Components/Devices," which also published on Sep. 18, 2014 and is incorporated herein by reference in its entirety.

The next generation of manufacturing technology will require complete spatial control of material and functionality as structures are created layer-by-layer, thereby providing fully customizable, high value, multi-functional products for the consumer, biomedical, aerospace, and defense industries. With contemporary AM (also known more popularly as 3D printing) providing the base fabrication process, a comprehensive manufacturing suite will be integrated seamlessly to include: 1) additive manufacturing of a wide variety of robust plastics/metals; 2) micromachining; 3) laser ablation; 4) embedding of wires, metal surfaces, and fine-pitch meshes submerged within the dielectric substrates; 5) microdispensing; 6) wire bonding; and 7) robotic component placement.

Collectively, the integrated technologies will fabricate multi-material structures through the integration of multiple integrated manufacturing systems (multi-technology) to provide multi-functional products (e.g., consumer wearable electronics, bio-medical devices, defense, thermal management, space and energy systems, etc.).

Paramount to this concept is the connection between conductive traces and surfaces at different levels of the 3D printed dielectric substrate as well as connecting the traces and surfaces to metallic pins of components at the same or different levels in the substrate. By spanning a void to serve as a via in the interlayer dielectric, connection of two layers of conductors with conductive inks is facilitated.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved 3D printing or additive manufacturing method.

It is another aspect of the disclosed embodiments to provide for an extrusion-based AM method enhanced with a range of possible secondary embedding processes with two or more structurally integrated metal objects spanning across one or more levels of the 3D printed plastic substrate.

It is another aspect of the disclosed embodiments to provide connections between metallic pins of components to other components or to conductive traces or surfaces at the same or different 3D printed layers.

It is a further aspect of the disclosed embodiments to provide for a three-dimensional electronic, biological, chemical, thermal management, or electromechanical apparatus formed by an AM process.

The aforementioned aspects and other objectives and advantages can now be achieved as described herein. In an example embodiment, a three-dimensional electronic, biological, chemical, thermal management, or electromechanical apparatus can be implemented. Such an apparatus includes a substrate and one or more layers of a three-dimensional structure configured on and/or from the substrate. The three-dimensional structure includes one or more internal cavities configured by an extrusion-based additive manufacturing system enhanced with a range of secondary embedding processes. The three-dimensional structure can be configured with one or more structural integrated metal objects spanning one or more of the internal cavities of the three-dimensional structure for enhanced electromagnetic properties.

In another example embodiment, a method of making a three-dimensional electronic, biological, chemical, thermal management, or electromechanical component/device can be implemented. Such a method can include the steps or operations of creating at least one layer of a three-dimensional structure by depositing a substrate, configuring the three-dimensional structure to include at least one internal cavity using an extrusion-based additive manufacturing system enhanced with a range of secondary embedding processes, and further configuring the three-dimensional structure with structural integrated metal objects spanning the internal cavity (or cavities) of the three-dimensional structure for enhanced electromagnetic properties.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments disclosed are related to the manufacture of three-dimensional printed components with structurally integrated metal objects serving as thermal or electrical interconnect. Wire embedding integrates wires into two layers of dielectric with a void (possibly circular and with one, two, or more layers of dielectric thickness). The top wire spans the void that will later be filled by dispensing of a conductive ink. This conductive ink via after curing serves as an interlayer conductor connection and connects both wires both mechanically and electrically. Optionally, a third dielectric layer can be printed before dispensing the conductive ink which provides only restricted access (choked via) that subsequently provides mechanical support and protection for the cured conductive ink via.

Figure 1:
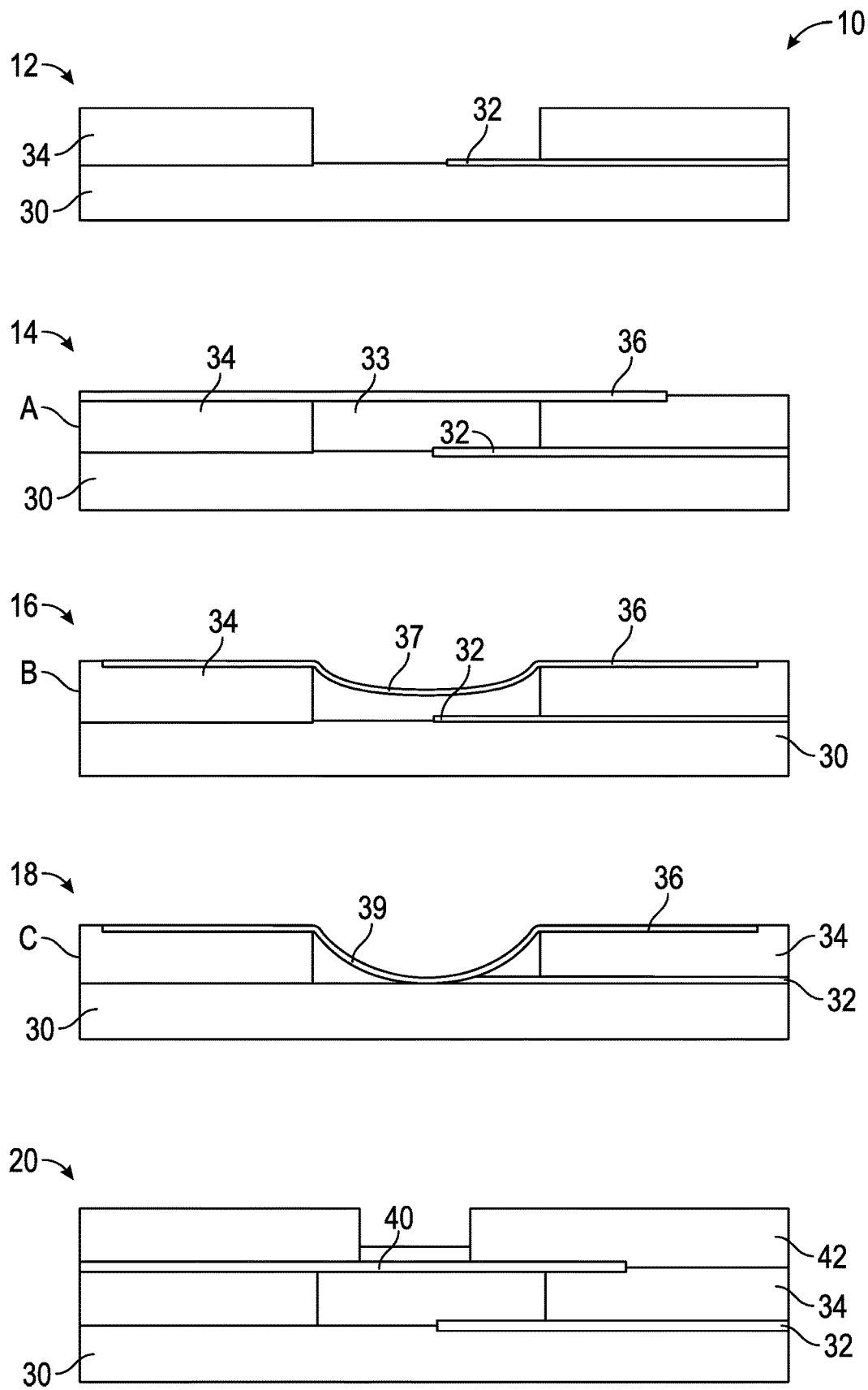
FIG. 1 illustrates a flow diagram depicting an improved AM method and apparatus formed by such a method in accordance with an example embodiment.

FIG. 1 illustrates a flow diagram depicting an improved AM method 10 in accordance with an example embodiment. Note that as utilized herein, the term "Additive Manufacturing" or AM refers to a process of joining materials to make objects from three-dimensional model data, usually (but not necessarily) layer upon layer, as opposed to subtractive manufacturing methodologies. Examples of different subtypes of AM include, for example, three-dimensional printing, rapid prototyping, and direct digital manufacturing (DDM).

The method 10 can be implemented as a three step process composed of a first step 12, optional second steps 14, 16, 18, and a third step 20. The flow diagram depicted in FIG. 1 includes a cross-section of the above three steps in the context of a 3D printing flow in which thermoplastic is deposited, a wire is integrated, and a second layer of polymer is deposited with a void to serve as a via as indicated by the first step 12 (also referred to as "Step 1") in FIG. 1. As shown at step 12, a metal component 32 comprising, for example, a copper wire or foil is deposited on a dielectric polymer 30. A second polymer layer 34 is located above the dielectric polymer 30. Thus, the metal component 32 (e.g., copper wire or foil) is integrated between the polymer layers 30 and 34.

The second step ("Step 2") can be implemented according to one of three possible second steps 14, 16, and 18 (also respectively A, B, and C in FIG. 1). A second wire can be integrated on top a dielectric which can span the void/via in one of three approaches (Step 2).

In step 14 or "Step A," a wire 36 can span a via hole 33 to enable inking/curing the via between conductive layers. Thus, in one case the wire can span the void 33 and is flush with the top level. In a second case as shown at step 16 ("Step B"), the wire 36 can be forced to drop in the via (as shown by wire portion 37 of wire 36) requiring less depth for conductive to make a connection between the wires 36 and 32.

In a third case or step 18 (Step C), the drooping of the wire 36 is sufficient to make coincidental contact between the two wires promoting conductivity between the two conductors. This drooping of wire 36 is indicated by a wire portion 39 of the wire. Thus according to step 18, the wire span can be pushed to the floor of the via to create a direct connection between wires 36 and 32, which would be improved and permanent with conductive ink.

In the third step 20 (Step 3), an operation can be implemented to dispense ink in the via and cure for mechanical an electrical connections. That is, conductive ink can be dispensed and cured in the void/via to make an electrical/mechanical connection between the two wires. Optionally, a third layer 42 of dielectric can provide potentially restricted access for dispensing the conductivity ink and protecting the via mechanically. A metal component 40 (wire or foil) is shown in step 20 located between layers 34 and 42. Optionally, additional plastic can be deposited to restrict access to the original via cavity prior to the dispensing and curing of the conductive ink in order to protect and support mechanically the ink.

Figure 2:
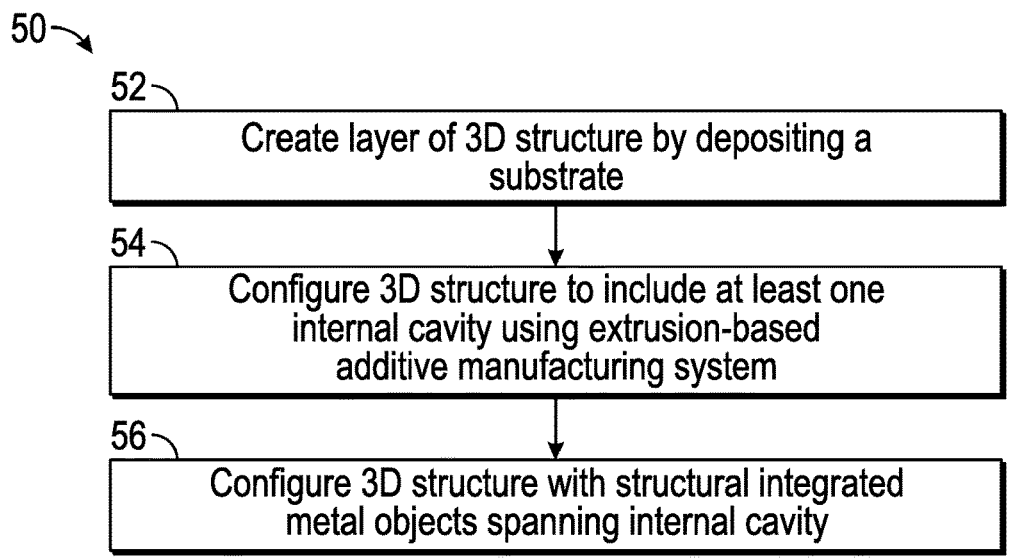
FIG. 2 illustrates a flow chart of operations depicting a method of making a three-dimensional electronic, biological, chemical, thermal management, or electromechanical component/device or apparatus, in accordance with an example embodiment.

FIG. 2 illustrates a flow chart of operations depicting a method 50 of making a three-dimensional electronic, biological, chemical, thermal management, or electromechanical component/device or apparatus, in accordance with an example embodiment. As indicated at block 52, a step or operation can be implemented for creating one or more layers of a three-dimensional structure by depositing a substrate. Then, as shown at block 54, a step or operation can be implemented for configuring the three-dimensional structure to include one or more internal cavities utilizing, for example, an extrusion-based additive manufacturing system (e.g., a 3D printer) enhanced with a range of secondary embedding processes. Finally, as depicted at block 56, a step or operation can be implemented for configuring the three-dimensional structure with structural integrated metal objects spanning the one or more internal cavities of the three-dimensional structure for enhanced electromagnetic properties.

Figure 3A:
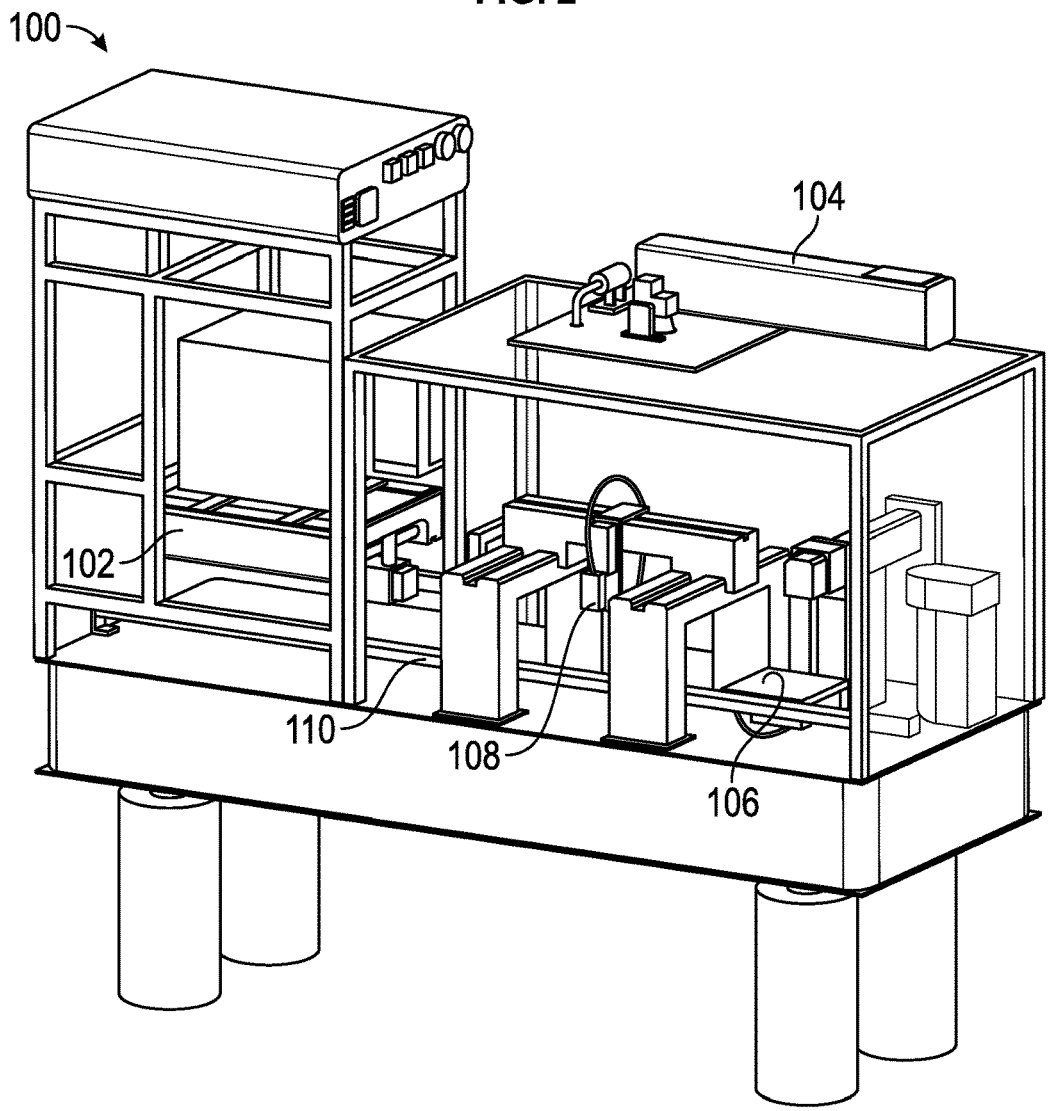
FIGS. 3A-3D illustrate an example of an extrusion-based additive manufacturing system for three-dimensional structural electronic, electromagnetic, and electromechanical components/devices, which can be utilized in accordance with an example embodiment.
Figure 3B:
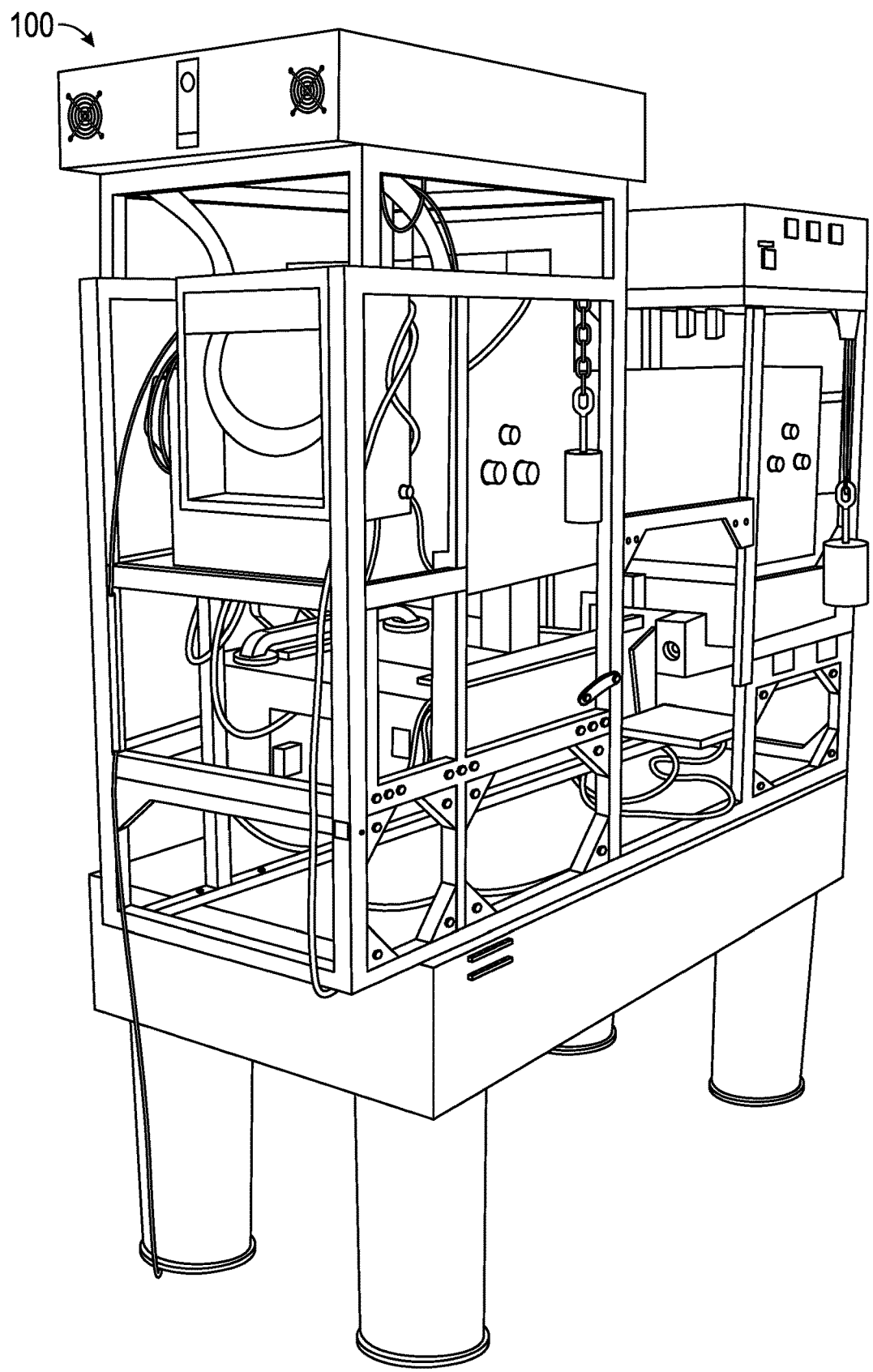
Figure 3C:
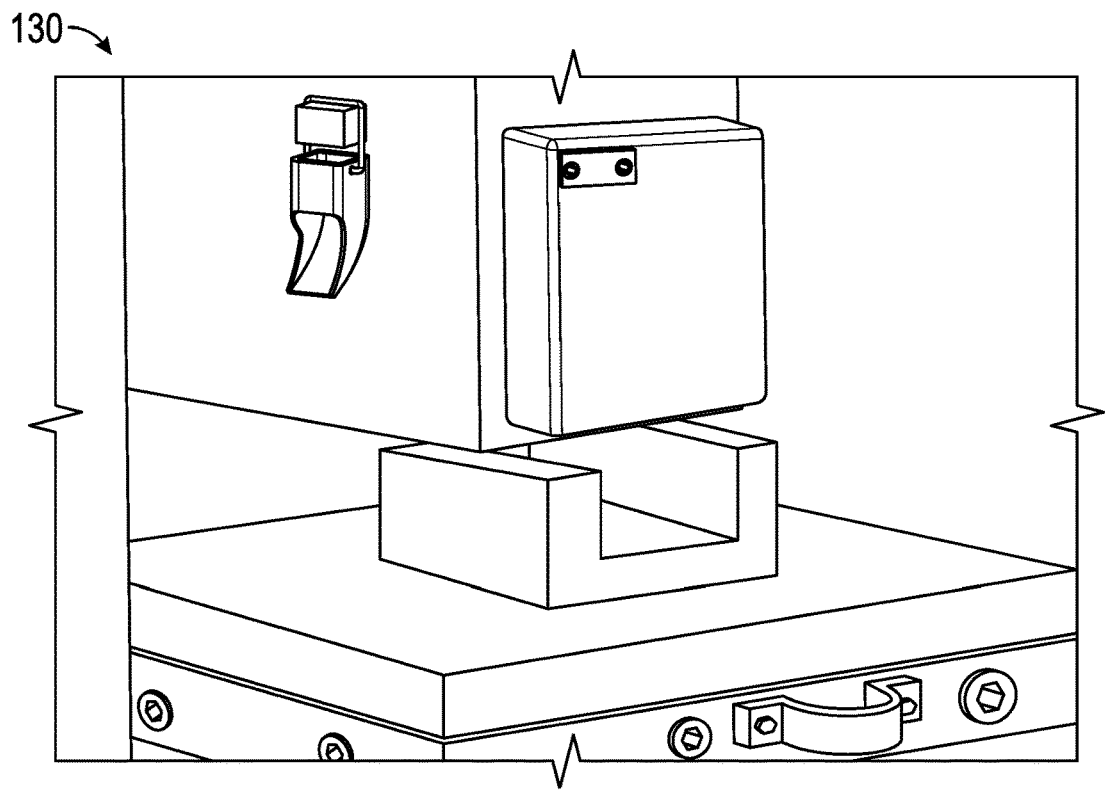
Figure 3D:
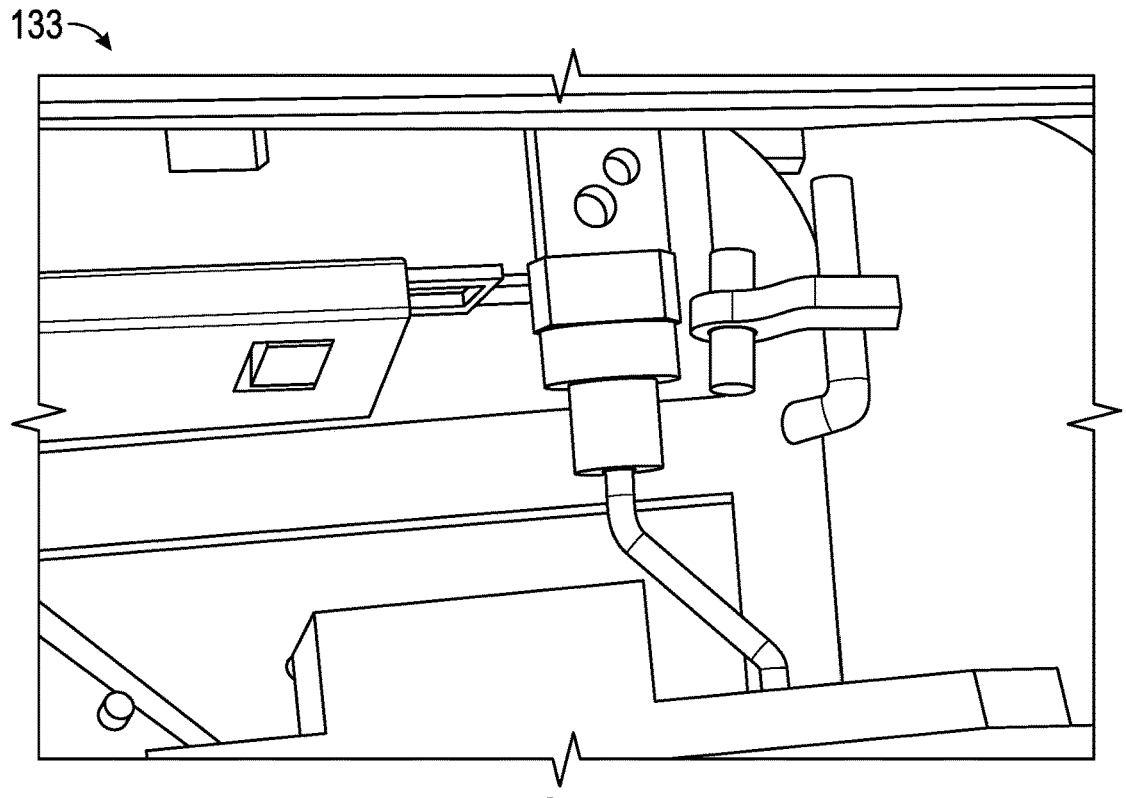

Referring now to FIGS. 3A-3D, an example of an extrusion-based additive manufacturing system 100 for three-dimensional structural electronic, electromagnetic, or electromechanical components/devices is shown, in accordance with an example embodiment. More specifically, FIGS. 3A-3B depict a partially completed system 100, FIG. 3C shows a FDM tooling head 130, and FIG. 3D shows a DW microdispensing head 132. The extrusion-based additive manufacturing device or system 100 shown in FIGS. 3A-3D can be enhanced with a range of secondary embedding processes. It should be appreciated that the embodiments shown in FIGS. 3A-3D are not considered to be limiting features of the disclosed embodiments and that other types of additive manufacturing devices or systems may be utilized in place of the extrusion-based additive manufacturing device or system 100 shown in FIGS. 3A-3D. It is preferred, however, that the extrusion-based additive manufacturing device or system offer a range of secondary embedding processes.

As shown in FIG. 3A, in some example embodiments, the system 100 for making a three-dimensional electronic, electromagnetic, or electromechanical component/device can include a fused deposition modeling machine 102 that creates one or more layers of a three-dimensional substrate by depositing a substrate material in a layer-by-layer fashion, a micro-machining machine, or a laser ablation machine 104 that removes a portion of the substrate to form a plurality of interconnection cavities and electronic component cavities within the substrate, a direct-write, or direct-print microdispensing machine 106 that fills the interconnection cavities with a conductive material, and a pick and place machine 108 that places one or more electronic components in the electronic component cavities. The laser 104 can also cure the conductive material. The system 100 can also include in some example embodiments a pneumatic slide 110 that transports the three-dimensional substrate to each machine or sub-system. All of the machines can be integrated into a single machine or similar manufacturing system or process.

It can be appreciated that parts produced by one or more of the disclosed embodiments can be used in various applications such as, for example: 1) unmanned aerial systems (UASs) and unmanned aerial vehicles (UAVs) by providing aerodynamic parts with embedded sensors, communications and electronics within structural components or by directly fabricating onto UAS and UAV surfaces; 2) customized, mission-specific disposable electronics; 3) truly 3D antennas and photonic devices that improve communications; 4) replacement components for virtually any electronic system on a naval vessel; 5) custom fit sailor-borne electronics and communications systems; 6) disposable floating depth-specific sensor systems; 7) biomedical devices; and 8) metamaterial structures.

Figure 4:
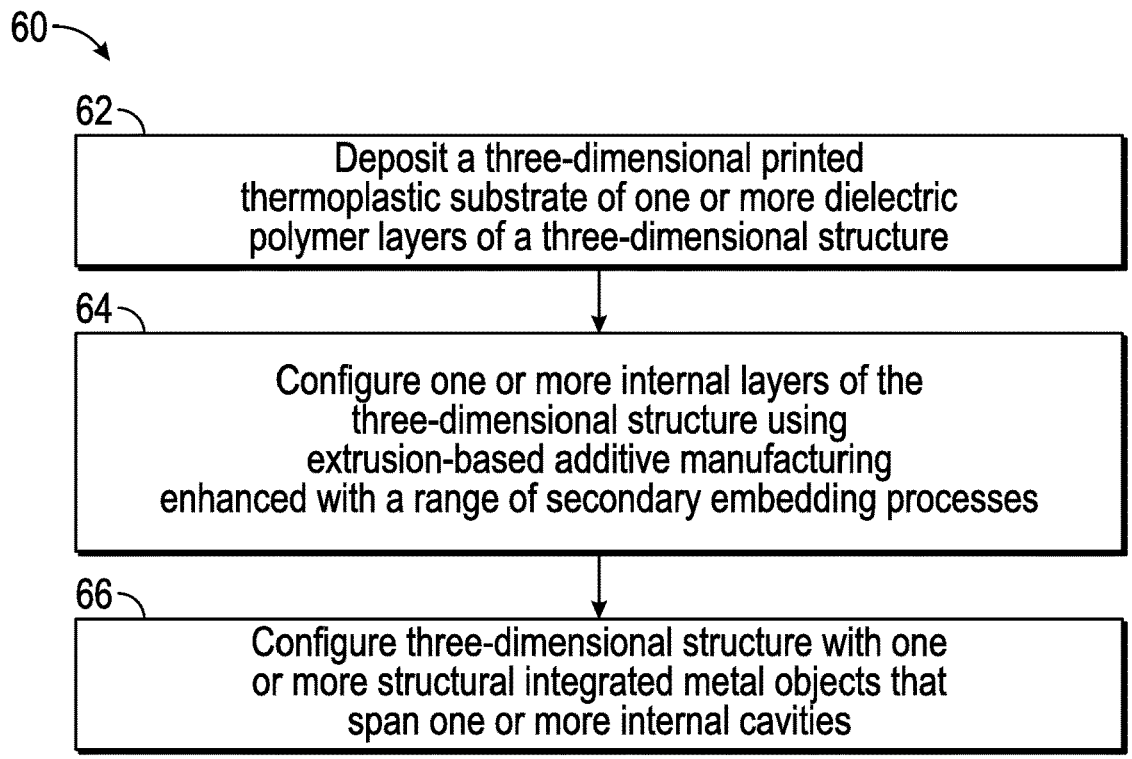
FIG. 4 illustrates a flow chart of operations depicting a method of making a three-dimensional electronic, biological, chemical, thermal management, or electromechanical component/device or apparatus using extrusion-based additive manufacturing system or apparatus enhanced with a range of secondary embedding processes, in accordance with an example embodiment.

FIG. 4 illustrates a flow chart of operations depicting a method 60 of making a three-dimensional electronic, biological, chemical, thermal management, or electromechanical component/device or apparatus using extrusion-based additive manufacturing system or apparatus enhanced with a range of secondary embedding processes, in accordance with an example embodiment. As indicated at block 62, a step or operation can be implemented in which a three-dimensional printed thermoplastic substrate is deposited with respect to one or more dielectric layers of a three-dimensional structure. In other words, the operation depicted at block 62 involves creating at least one layer of a three-dimensional structure by depositing a substrate. In the example embodiment depicted in FIG. 4, the substrate constitutes a three-dimensional printed thermoplastic substrate and the "at least one layer" constitutes a dielectric polymer layer.

Thereafter, as illustrated at block 64, an operation can be implemented in which one or more internal layers of the three-dimensional structure are configured using an extrusion-based additive manufacturing device or system such as, for example, the system 100 depicted and discussed herein with respect to FIGS. 3A-3D. Such an extrusion-based additive manufacturing device or system is preferably enhanced with a range of secondary embedding processes as discussed previously herein. Thereafter, as shown at block 66, a step or operation can be implemented in which a three-dimensional structure is configured with one or more structural integrated metal objects that snap one or more internal cavities as also discussed previously herein.

Figure 5:
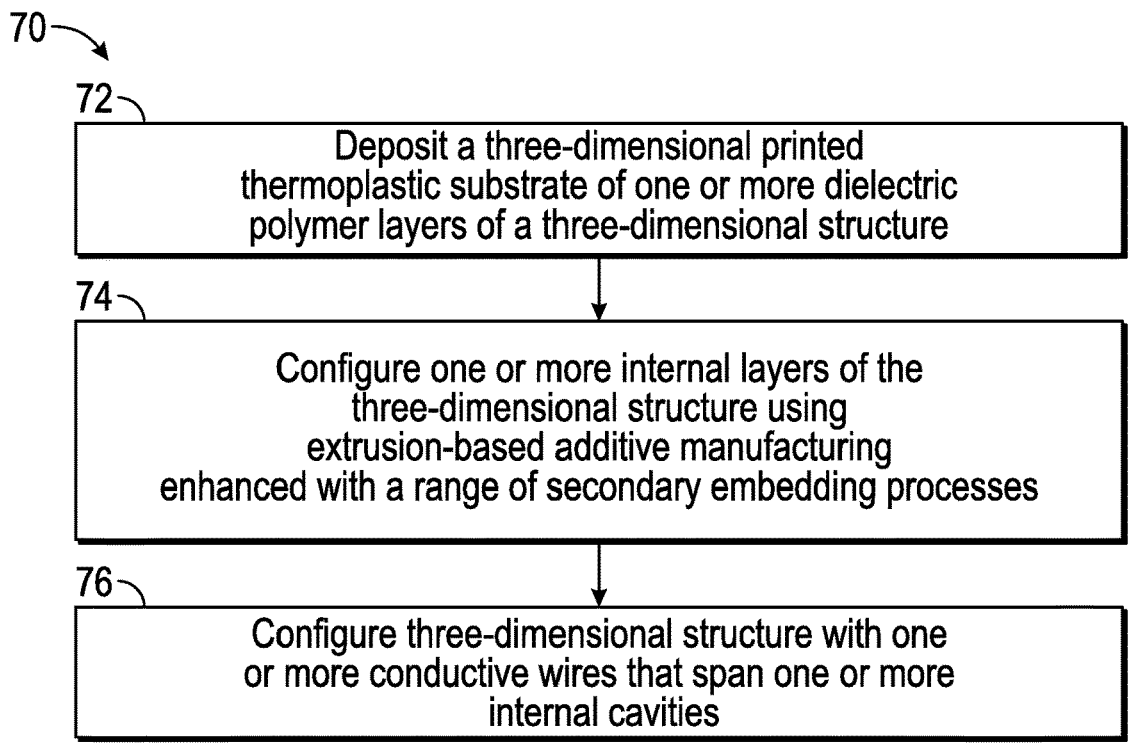
FIG. 5 illustrates a flow chart of operations depicting a method of making a three-dimensional electronic, biological, chemical, thermal management, or electromechanical component/device that includes conductive wires spanning one or more internal cavities, in accordance with an example embodiment.

FIG. 5 illustrates a flow chart of operations depicting a method 70 of making a three-dimensional electronic, biological, chemical, thermal management, or electromechanical component/device that includes conductive wires spanning one or more internal cavities, in accordance with an example embodiment. Note that the method shown in FIG. 5 is similar to that shown in FIG. 4, albeit with some minor differences. For example, the operation depicted at blocks 72 and 74 in FIG. 5 are similar to the operations respectively depicted in blocks 62 and 64 of FIG. 4. The operation depicted at block 76 of FIG. 5 involves a step or operation of configuring the three-dimensional structure with one or more conductive wires that span one or more of the internal cavities.

Figure 6:
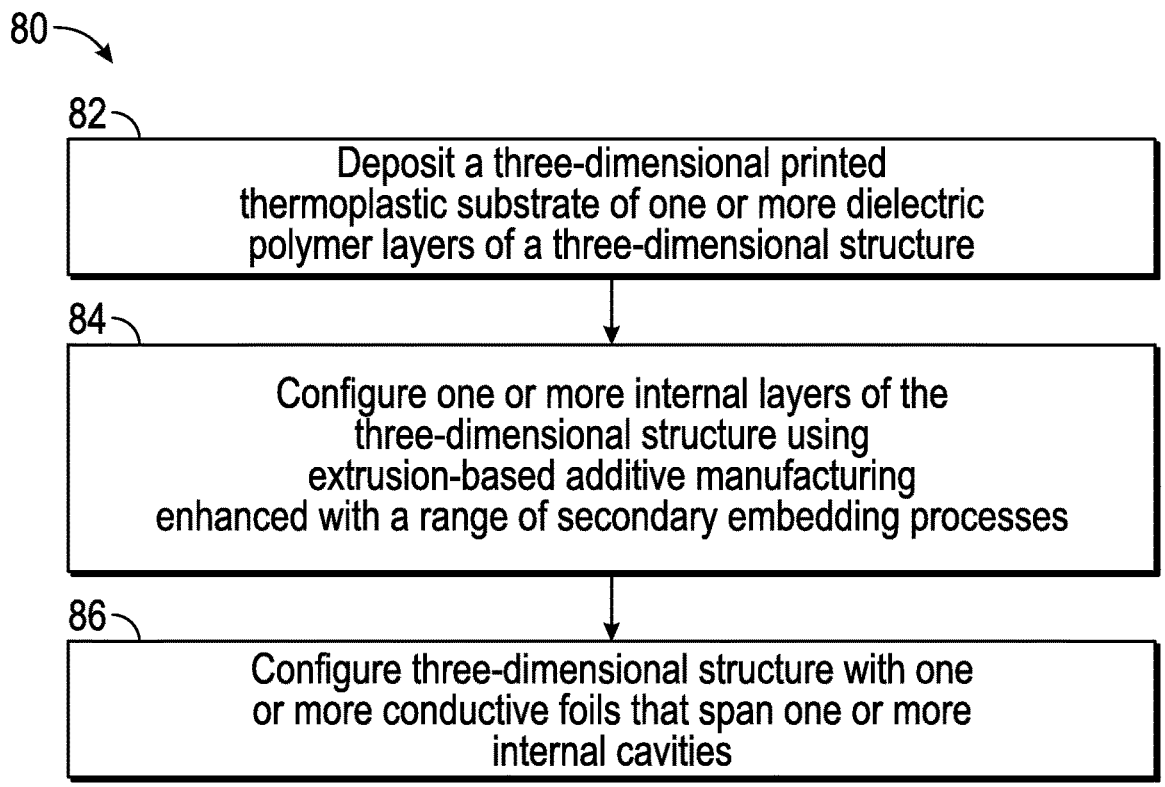
FIG. 6 illustrates a flow chart of operations depicting a method of making a three-dimensional electronic, biological, chemical, thermal management, or electromechanical component/device that includes conductive foils spanning one or more internal cavities, in accordance with an example embodiment.

FIG. 6 illustrates a flow chart of operations depicting a method 80 of making a three-dimensional electronic, biological, chemical, thermal management, or electromechanical component/device that includes conductive foils spanning one or more internal cavities, in accordance with an example embodiment. The method shown in FIG. 6 is similar to that shown in FIG. 4, albeit with some minor differences. For example, the operation depicted at blocks 82 and 84 in FIG. 6 are similar to the operations respectively depicted in blocks 62 and 64 of FIG. 4. The operation depicted at block 86 of FIG. 6 involves a step or operation of configuring the three-dimensional structure with one or more conductive foils that span one or more of the internal cavities.

Figure 7:
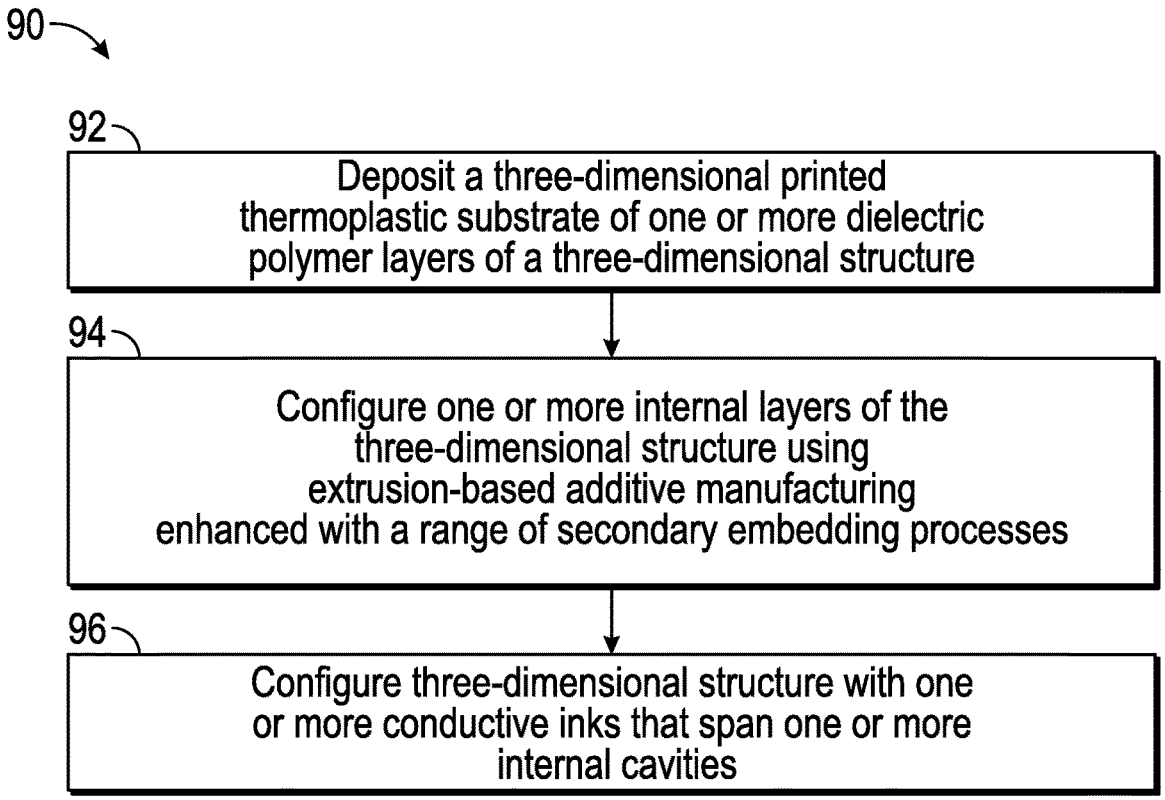
FIG. 7 illustrates a flow chart of operations depicting a method of making a three-dimensional electronic, biological, chemical, thermal management, or electromechanical component/device that includes conductive inks spanning one or more internal cavities, in accordance with an example embodiment.

FIG. 7 illustrates a flow chart of operations depicting a method 90 of making a three-dimensional electronic, biological, chemical, thermal management, or electromechanical component/device that includes conductive inks spanning one or more internal cavities, in accordance with an example embodiment. The method shown in FIG. 7 is similar to that shown in FIG. 4, again with some minor differences. For example, the operation depicted at blocks 92 and 94 in FIG. 7 are similar to the operations respectively depicted in blocks 62 and 64 of FIG. 4. The operation depicted at block 96 of FIG. 7, however, involves a step or operation of configuring the three-dimensional structure with one or more conductive inks that span one or more of the internal cavities.

Based on the foregoing, it can be appreciated that a number of varying embodiments are disclosed herein. For example, in one embodiment, a three-dimensional electronic, biological, chemical, thermal management, or electromechanical apparatus (or system) can be implemented, which includes: a substrate; at least one layer of a three-dimensional structure configured on the substrate. The three-dimensional structure includes at least one internal cavity configured by an extrusion-based additive manufacturing system enhanced with a range of secondary embedding processes, the three-dimensional structure further configured with at least one structural integrated metal object spanning the at least one internal cavity of the three-dimensional structure for enhanced electromagnetic properties.

In some example embodiments, the aforementioned substrate can be configured as a 3D printed thermoplastic substrate. In another example embodiment, the at least one layer of the three dimensional structure can be a dielectric polymer. In yet another example embodiment, the at least one structural integrated metal object can be a conductive wire. In still another example embodiment, the at least one structural integrated metal object can be a conductive foil. In another example embodiment, the at least one structural integrated metal object can be configured from conductive ink.

In another example embodiment, a method of making a three-dimensional electronic, biological, chemical, thermal management, or electromechanical component/device can be implemented. Such a method can include steps or operations such as, for example: creating at least one layer of a three-dimensional structure by depositing a substrate; and configuring the three-dimensional structure to include at least one internal cavity using an extrusion-based additive manufacturing system enhanced with a range of secondary embedding processes and further configuring the three-dimensional structure with structural integrated metal objects spanning the at least one internal cavity of the three-dimensional structure for enhanced electromagnetic properties.

It may be understood that particular embodiments described herein are shown by way of illustration and not as limitations of such embodiments. The principal features of the disclosed embodiments can be employed in various embodiments without departing from the scope of such embodiments. Those skilled in the art will recognize, or be able to ascertain using no more than routine experimentation, numerous equivalents to the specific procedures described herein. Such equivalents are considered to be within the scope of the disclosed embodiments and are covered by the claims.

All publications, patents, and patent applications mentioned in the specification are indicative of the level of skill of those skilled in the art to which this invention pertains. All publications, patents, and patent applications are herein incorporated by reference to the same extent as if each individual publication, patent, or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as AA, AAA, BB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods the disclosed embodiments have been described in terms of preferred embodiments, it may be apparent to those skilled in the art that variations may be applied to the compositions and/or methods and in the steps or in the sequence of steps of the method described herein without departing from the concept, spirit, and scope of the disclosed embodiments. All such similar substitutes and modifications apparent to those skilled in the art are deemed to be within the spirit, scope, and concept of the disclosed embodiments as defined by the appended claims.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method of making a three-dimension-printed electronic, biological, chemical, thermal management, or electromechanical component/device, the method comprising:
   creating at least one layer of a three-dimensional structure by depositing a substrate using extrusion-based additive manufacturing;
   forming at least one internal cavity within the three-dimensional structure during additive manufacturing;
   embedding at least one metal object into the three-dimensional structure, wherein the structural integrated metal object spans the internal cavity;
   filling the internal cavity with a conductive ink; and
   curing the conductive ink.

2. The method of claim 1, wherein the substrate is a three-dimension-printed thermoplastic substrate.

3. The method of claim 1, wherein at least one layer of the three-dimensional structure comprises a dielectric polymer.

4. The method of claim 1, wherein the metal object comprises a conductive wire.

5. A method of manufacturing a 3D-printed device, the method comprising:
   forming a first substrate layer using additive manufacturing;
   embedding a first metal object in a top surface of the first substrate layer;
   forming a second substrate layer over the first substrate layer and first metal object using additive manufacturing, wherein the second substrate layer comprises a void exposing a portion of the first metal object;
   embedding a second metal object in a top surface of the second substrate layer, wherein the second metal object spans the void in the second substrate layer;
   filling the void in the second substrate layer with a conductive ink; and
   curing the conductive ink, wherein the cured conductive ink provides a mechanical conductive connection between the first metal object and the second metal object.

6. The method of claim 5, further comprising forming a third substrate layer over the second substrate layer and second metal object using additive manufacturing.

7. The method of claim 6, wherein the third substrate layer provides restricted access for dispensing the conductive ink into the void and provides mechanical support to the cured conductive ink.

8. The method of claim 5, wherein the substrate layers comprise a dielectric polymer.

9. The method of claim 5, further comprising depressing a portion of the second metal object into the void below the top surface of the second substrate layer to shorten a conductive path between the first metal object and the second metal object through the conductive ink.

10. The method of claim 5, further comprising depressing a portion of the second metal object into the void below the top surface of the second substrate layer to form a direct contact between the first metal object and the second metal object.

11. The method of claim 5, wherein the first metal object and second metal object comprise conductive wires.

12. The method of claim 5, wherein the void in the second substrate layer is formed using micro-machining.

13. The method of claim 5, wherein the void in the second substrate layer is formed using laser ablation.

14. A method of manufacturing a 3D-printed device, the method comprising:
   forming a first dielectric layer using additive manufacturing;
   embedding a first metal object in a top surface of the first dielectric layer;
   forming a second dielectric layer over the first dielectric layer and first metal object using additive manufacturing,
   forming a via through the second dielectric layer to expose a portion of the first metal object;
   embedding a second metal object in a top surface of the second dielectric layer, wherein the second metal object spans the via;
   forming a third dielectric layer over the second dielectric layer and second metal object using additive manufacturing;
   filling the via with a conductive ink; and
   curing the conductive ink, wherein the cured conductive ink provides a mechanical and conductive connection between the first metal object and the second metal object.

15. The method of claim 14, wherein the third dielectric layer makes the via a choked via and provides mechanical support to the cured conductive ink.

16. The method of claim 14, further comprising depressing a portion of the second metal object into the via below the top surface of the second dielectric layer to shorten a conductive path between the first metal object and the second metal object through the conductive ink.

17. The method of claim 14, further comprising depressing a portion of the second metal object into the via below the top surface of the second dielectric layer to form a direct contact between the first metal object and the second metal object.

18. The method of claim 14, wherein the first metal object and second metal object comprise conductive wires.

19. The method of claim 14, wherein the via is formed using laser ablation.

* * * * *